Figure 1:
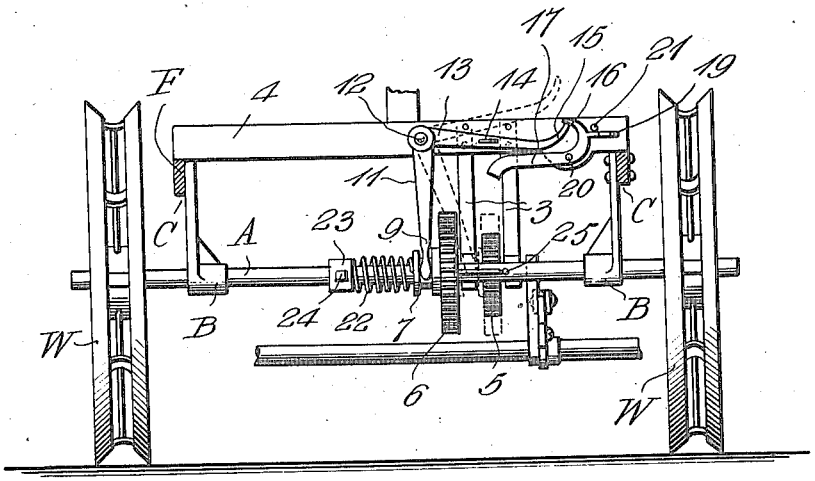

C. J. BLASINGAME.
GEAR SHIFTING MECHANISM AND LOCK THEREFOR.
APPLICATION FILED AUG. 31, 1914.

1,166,318.

Patented Dec. 28, 1915.

Inventor
Charles J. Blasingame

Witnesses

UNITED STATES PATENT OFFICE.

CHARLES J. BLASINGAME, OF GIBSONBURG, OHIO.

GEAR-SHIFTING MECHANISM AND LOCK THEREFOR.

1,166,318.  Specification of Letters Patent.  Patented Dec. 28, 1915.

Application filed August 31, 1914. Serial No. 859,435.

*To all whom it may concern:*

Be it known that I, CHARLES J. BLASINGAME, a citizen of the United States, residing at Gibsonburg, in the county of Sandusky and State of Ohio, have invented certain new and useful Improvements in Gear-Shifting Mechanism and Locks Therefor; and I do declare the following to be a full, clear, and exact description of the invention such as will enable others skilled in the art to which is appertains to make and use the same.

My invention relates to devices for shifting gears and locking the same in operative position and more particularly to devices of this character primarily designed to be used as a clutch in connection with corn planters.

The object of the invention is to provide an extremely simple and comparatively inexpensive device which will be efficient and durable and will possess a number of advantageous characteristics.

With the above in view, the invention resides in certain novel features of construction and combination herein described and claimed and shown in the drawings wherein—

Figure 2:
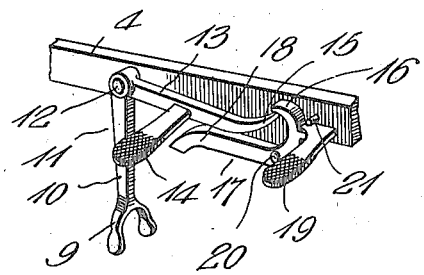

Figure 1 is a vertical transverse section of a corn planter showing the application of the invention to use; and Fig. 2 is a perspective view of the invention and the supporting bar thereof.

In the accompanying drawings, I have shown a corn planter C which includes the usual main frame F, drive wheels W, transverse axle A and bearings B depending from the main frame and revolubly receiving said axle. Hangers 3 depend from a transverse cross bar 4 having its opposite ends secured to the sides of the frame F substantially above the axle A.

Rigidly mounted in advance of the axle A and held against axial shifting by the hangers 3, is a spur gear 5. The gear 5 is designed to mesh with a driving gear 6 which is slidably keyed upon the axle A and which is provided with a peripherally grooved hub 7 whose groove receives the furcations of the forked lower end 9 of an upright arm 10, the latter constituting one arm of a bell crank lever 11 which is pivoted at its angle to the transverse bar 4 as indicated at 12, the remaining arm 13 of the lever 11 extending laterally from the pivot 12 and lying substantially in contact with one end portion of the bar 4. The arm 13 is preferably provided with a rearwardly extending pedal or foot plate 14 by means of which the same may be depressed to engage the upwardly curved free end 15 of said arm 13 with a nose 16 of a gravity catch 17 which is likewise pivoted to the transverse bar 4, said catch including the nose 16 which is formed by bending one end of a lever 18 upwardly and inwardly as clearly shown in the drawings, and a foot plate or pedal 19 which extends rearwardly from said nose whereby the lever 18 may be rocked around its pivot 20 to disengage the nose 16 from the curved end 15 of the bell crank 11.

By referring more particularly to Figs. 3 and 5, it will be seen that the plate 19 joins the curved end of the lever 18 and that a stop pin 21 is provided for the purpose of limiting the rocking movement of said lever in one direction, said pin being here shown as having one end anchored within the bar 4, and as being located in the upward path of a portion of the plate 19. For the purpose of normally shifting or projecting the gear 6 upon the axle A, I provide a coiled spring 22 which encircles a portion of the axle A and bears at its opposite ends, against the hub 7 and an adjustable stop 23 secured on said axle by means of a stop screw 24. In connection with the spring 22, it becomes expedient to provide a second stop 25 which is here shown in the form of a transverse pin passing through the axle A, said stop 25 being provided for the purpose of limiting the movement of the gear 6 when the same is shifted by its spring 22.

With the parts as above described, assuming that the parts stand as seen in Fig. 1 with the curved end 15 of the bell crank 11 located beneath the nose 16 of the gravity catch 17, and it is desired to shift the gear 6 upon the axle A to cause the same to mesh with the gear 5, it is simply necessary to depress the foot plate 19 which rocks the gravity catch 17 around its pivot 20 thus releasing the bell crank and allowing the tension of the spring 22 to shift said gear 6, this shifting movement now moving the bell crank to the position shown in dotted lines in Fig. 3. When it again becomes necessary to disengage the gears 6 and 5, the foot plate 14 may be depressed, thereby, through the action of the bell crank lever 11, retracting the gear 6 to an extent great enough to cause its teeth to disengage the teeth of the gear 5. This movement of the bell crank 11 will cause the curved end thereof to contact with the nose 16 thus rocking the weighted end of the lever 18 upwardly to allow said curved end to be positioned beneath the nose 16, it being understood that said weighted end of the lever will return the gravity catch to such a position.

From the foregoing description taken in connection with the accompanying drawings it will be seen that I have provided extremely simple and efficient means whereby an axially movable gear may be shifted relatively to a fixed gear and that simple and novel means has likewise been provided whereby the shiftable gear may be retained in retracted position.

In the present application of the invention, movement of the axially shiftable gear 6 into mesh with the relatively fixed gear 5, causes the driving wheels W to operate the seed dropping mechanism of the planter in any one of a number of ways forming no part of the present invention, but it is to be understood that if the gear shifting means be applied to use on other machines, the gear shifted may perform other functions than that of the gear illustrated.

Having thus described my invention what I claim is:

In combination a bell crank fulcrumed at its angle and having an upright arm forked at its end, and a horizontal arm having its outer end curved upwardly in the direction of travel of the crank, a foot pedal formed integrally with and projecting laterally from the horizontal arm of the bell crank, a horizontal lever disposed beneath said arm and fulcrumed adjacent its outer end, said end being curved upwardly and inwardly to provide a nose for coaction with the upwardly curved end of the aforesaid horizontal arm of the crank, and an additional foot pedal formed integrally with and projecting laterally from said nose.

In testimony whereof I have hereunto set my hand in presence of two subscribing witnesses.

CHARLES J. BLASINGAME.

Witnesses:
E. K. VOORHEES,
W. H. BREENS, Jr.